United States Patent
Cova et al.

(10) Patent No.: US 11,190,433 B2
(45) Date of Patent: Nov. 30, 2021

(54) SYSTEMS AND METHODS FOR IDENTIFYING INFECTED NETWORK NODES BASED ON ANOMALOUS BEHAVIOR MODEL

(71) Applicant: VMware, Inc., Palo Alto, CA (US)

(72) Inventors: Marco Cova, London (GB); Corrado Leita, London (GB)

(73) Assignee: VMware, Inc., Palo Alto, CA (US)

( * ) Notice: Subject to any disclaimer, the term of this patent is extended or adjusted under 35 U.S.C. 154(b) by 187 days.

(21) Appl. No.: 16/523,441

(22) Filed: Jul. 26, 2019

(65) Prior Publication Data

US 2021/0029013 A1 Jan. 28, 2021

(51) Int. Cl.
| | | |
|---|---|---|
| *H04L 12/00* | (2006.01) | |
| *H04L 12/26* | (2006.01) | |
| *H04L 29/06* | (2006.01) | |
| *H04L 12/24* | (2006.01) | |

(52) U.S. Cl.
CPC .............. *H04L 43/16* (2013.01); *H04L 41/14* (2013.01); *H04L 43/106* (2013.01); *H04L 63/1425* (2013.01); *H04L 63/145* (2013.01); *H04L 2463/121* (2013.01)

(58) Field of Classification Search
CPC ... H04L 43/0876; H04L 43/16; H04L 63/145; H04L 43/106; H04L 2463/121; H04L 63/1425; H04L 41/14; H04L 41/142; H04L 41/145
USPC .............................. 726/23; 709/220, 223, 225
See application file for complete search history.

(56) References Cited

U.S. PATENT DOCUMENTS

| | | | |
|---|---|---|---|
| 6,182,022 B1* | 1/2001 | Mayle ................. | G06F 11/3409 702/182 |
| 9,160,760 B2* | 10/2015 | Vasseur ............... | H04L 63/1425 |
| 2007/0064617 A1* | 3/2007 | Reves .................... | H04L 63/14 370/252 |
| 2015/0304349 A1* | 10/2015 | Bernstein ............ | H04L 63/1425 726/22 |
| 2016/0112440 A1* | 4/2016 | Kolton .................. | H04L 63/101 726/1 |
| 2017/0089172 A1* | 3/2017 | Zhao ....................... | E21B 43/12 |
| 2017/0149804 A1* | 5/2017 | Kolbitsch ........... | H04L 63/1416 |

* cited by examiner

*Primary Examiner* — Frantz Coby

(74) *Attorney, Agent, or Firm* — Fish & Richardson P.C.

(57) ABSTRACT

The present disclosure is directed to a method of identifying an infected network node. The method includes identifying a first network node as infected. The method includes collecting a first set of network data from the first network node including anomalous activities performed by the first network node. The method includes generating an anomalous behavior model using the first set of network data. The method includes collecting a second set of network data from a second network node including anomalous activities performed by the second network node. The method includes comparing the second set of data to the generated anomalous behavior model. The method includes determining, from the comparison, that a similarity between first characteristics and second characteristics exceeds a predefined threshold. The method includes ascertaining, based on the determination, the second network node as an infected network node.

20 Claims, 4 Drawing Sheets

```
"""alert tcp $HOME_NET any -> $EXTERNAL_NET $HTTP_PORTS
([msg:"Alert: (Dropper) Pushdo";]
flow:to_server,established; content:"POST"; http_method;
urilen:39; content:"/?ptrxcz_"; http_uri;
pcre:"/^\/\?ptrxcz_[a-z0-9A-Z]{30}$/U";
reference:md5,58ffe2b79be4e789be80f92b7f96e20c;
classtype:trojan-activity; sid:101626; rev:1;]"""
```

FIG. 3

SYSTEMS AND METHODS FOR IDENTIFYING INFECTED NETWORK NODES BASED ON ANOMALOUS BEHAVIOR MODEL

BACKGROUND

The present invention relates generally to the field of computer security. In general, a computing device may have one or more vulnerabilities that can be leveraged by malicious code to compromise the computing device. Malicious code may also be introduced onto a computing device by deceiving a user. Malicious code running on a compromised machine may install additional malware components. Computer security is improved through the detection of malicious software ("malware") that uses malicious code to exploit vulnerabilities (or deceive users) and repurposes infected computers, and performs malicious actions once installed on a compromised host. Once malware is detected and the exploits are understood, security systems may be designed to recognize and block the malware and the vulnerabilities may be patched.

BRIEF SUMMARY

In one aspect, the present disclosure is directed to a method of identifying an infected network node based on an anomalous behavior model. The method can include identifying a first one of a plurality of network nodes as infected. The method can include collecting a first set of network data from the first network node including one or more anomalous activities performed by the first network node. The method can include generating an anomalous behavior model using the first set of network data. The method can include collecting a second set of network data from a second one of the plurality of network nodes including one or more anomalous activities performed by the second network node. The method can include comparing the second set of data to the generated anomalous behavior model. The method can include determining, from the comparison, that a similarity between a first characteristic associated with the one or more anomalous activities performed by the first network node and a second characteristic associated with the one or more anomalous activities performed by the second network node exceeds a predefined threshold. The method can include ascertaining, based on the determination, the second network node as an infected network node.

In some embodiments, the method can further include determining a first timestamp corresponding to when the first network node is identified as infected. The method can include collecting the first set of network data to include the one or more anomalous activities that each occurred at a timestamp substantially close to the first timestamp.

In some embodiments, the first characteristic includes at least one of a recurring interval of the one or more anomalous activities performed by the first network node or an occurrence time of each of the one or more anomalous activities performed by the first network node. The second characteristic includes at least one of a recurring interval of the one or more anomalous activities performed by the first network node and an occurrence time of each of the one or more anomalous activities performed by the second network node.

In some embodiments, the first characteristic includes a data size of the first set of network data. The second characteristic includes a data size of the second set of network data.

In some embodiments, the first characteristic includes a data type of the first set of network data. The second characteristic includes a data type of the second set of network data.

In some embodiments, the first characteristic includes a destination point to which the first set of network data is transmitted. The second characteristic includes a destination point to which the second set of network data is transmitted.

In some embodiment, the method can further include communicating with a threat detection system to ascertain that the first network node is infected prior to collecting the first set of network data.

In another aspect, the present disclosure is directed to a computing device configured to identify an infected network node based on an anomalous behavior model. The computing device includes a memory, and one or more processors operatively coupled to the memory. The one or more processors can identify a first one of a plurality of network nodes as infected. The one or more processors can collect a first set of network data from the first network node including one or more anomalous activities performed by the first network node. The one or more processors can generate an anomalous behavior model using the first set of network data. The one or more processors can collect a second set of network data from a second one of the plurality of network nodes including one or more anomalous activities performed by the second network node. The one or more processors can compare the second set of data to the generated anomalous behavior model. The one or more processors can determine, from the comparison, that a similarity between a first characteristic associated with the one or more anomalous activities performed by the second network node and a second characteristic associated with the one or more anomalous activities performed by the first network node exceeds a predefined threshold. The one or more processors can ascertain, based on the determination, the second network node as an infected network node.

In some embodiments, the one or more processors can further determine a first timestamp corresponding to when the first network node is identified as infected. The one or more processors can further collect the first set of network data to include the one or more anomalous activities that each occurred at a timestamp substantially close to the first timestamp.

In some embodiments, the first characteristic includes at least one of a recurring interval of the one or more anomalous activities performed by the first network node or an occurrence time of each of the one or more anomalous activities performed by the first network node. The second characteristic includes at least one of a recurring interval of the one or more anomalous activities performed by the first network node and an occurrence time of each of the one or more anomalous activities performed by the second network node.

In some embodiments, the first characteristic includes a data size of the first set of network data. The second characteristic includes a data size of the second set of network data.

In some embodiments, the first characteristic includes a data type of the first set of network data. The second characteristic includes a data type of the second set of network data.

In some embodiments, the first characteristic includes a destination point to which the first set of network data is transmitted. The second characteristic includes a destination point to which the second set of network data is transmitted.

In some embodiments, the one or more processors can further communicate with a threat detection system to ascertain that the first network node is infected prior to collecting the first set of network data.

In yet another aspect, the present disclosure is directed to a non-transitory computer readable medium storing program instructions. The program instructions cause one or more processors to identify a first one of a plurality of network nodes as infected. The program instructions cause the one or more processors to collect a first set of network data from the first network node including one or more anomalous activities performed by the first network node. The program instructions cause the one or more processors to generate an anomalous behavior model using the first set of network data. The program instructions cause the one or more processors to collect a second set of network data from a second one of the plurality of network nodes including one or more anomalous activities performed by the second network node. The program instructions cause the one or more processors to compare the second set of data to the generated anomalous behavior model. The program instructions cause the one or more processors to determine, from the comparison, that a similarity between a first characteristic associated with the one or more anomalous activities performed by the second network node and a second characteristic associated with the one or more anomalous activities performed by the first network node exceeds a predefined threshold. The program instructions cause the one or more processors to ascertain, based on the determination, the second network node as an infected network node.

In some embodiments, the program instructions cause the one or more processors further to determine a first timestamp corresponding to when the first network node is identified as infected. The program instructions cause the one or more processors further to collect the first set of network data to include the one or more anomalous activities that each occurred at a timestamp substantially close to the first timestamp.

In some embodiments, the first characteristic includes at least one of a recurring interval of the one or more anomalous activities performed by the first network node or an occurrence time of each of the one or more anomalous activities performed by the first network node. The second characteristic includes at least one of a recurring interval of the one or more anomalous activities performed by the first network node and an occurrence time of each of the one or more anomalous activities performed by the second network node.

In some embodiments, the first characteristic includes a data size of the first set of network data. The second characteristic includes a data size of the second set of network data.

In some embodiments, the first characteristic includes a data type of the first set of network data. The second characteristic includes a data type of the second set of network data.

In some embodiments, the first characteristic includes a destination point to which the first set of network data is transmitted. The second characteristic includes a destination point to which the second set of network data is transmitted.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 3 is a diagrammatic view of one embodiment of a traffic model, according to an exemplary embodiment.

DETAILED DESCRIPTION

Figure 1:
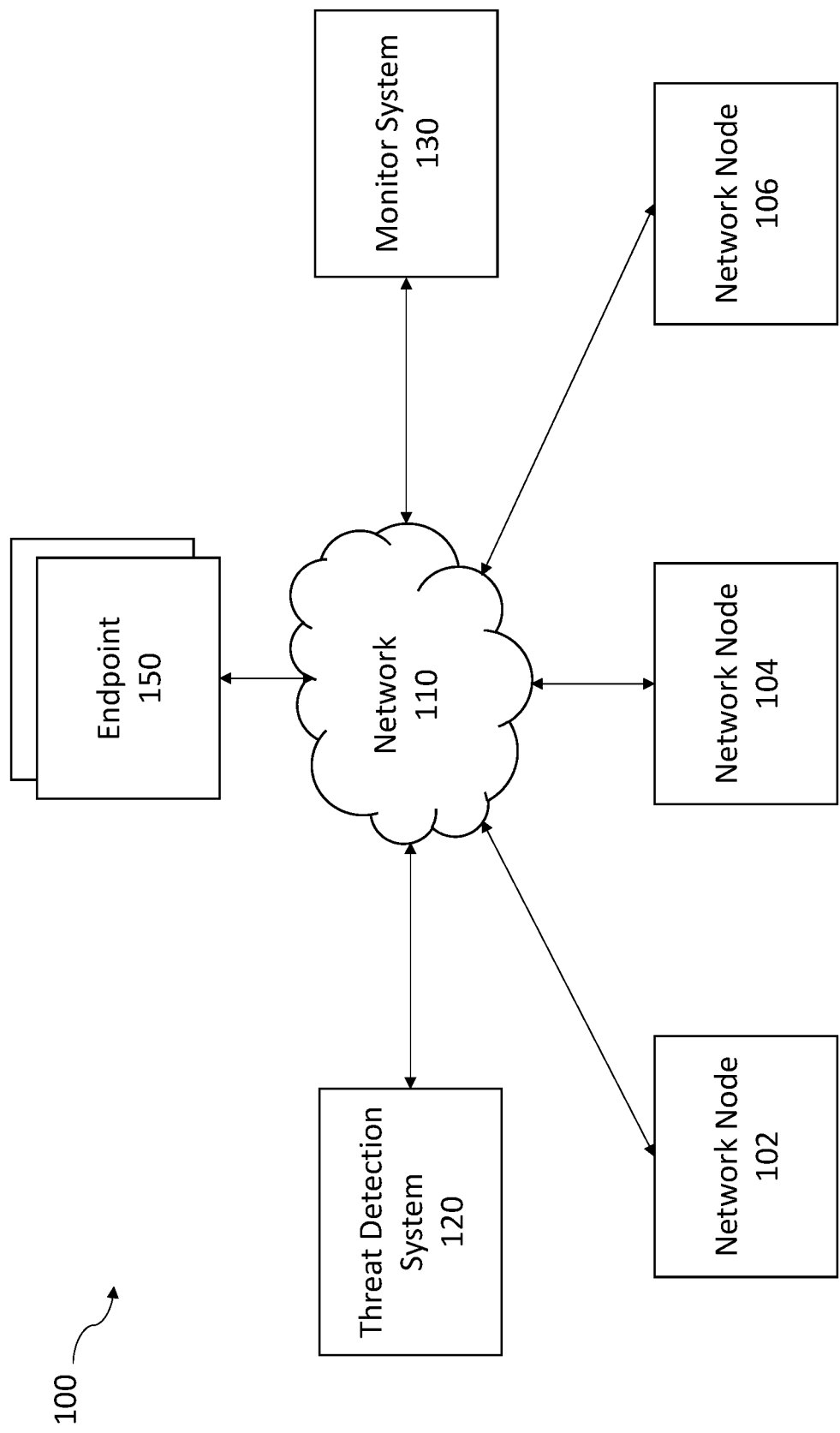
FIG. 1 is a block diagram illustrating one embodiment of computing systems in a network environment, according to an exemplary embodiment.

Following below are more detailed descriptions of various concepts related to, and embodiments of, methods, apparatuses, and systems introduced above. The various concepts introduced above and discussed in greater detail below may be implemented in any of numerous ways, as the concepts described are not limited to any particular manner of embodiment. Examples of specific embodiments and applications are provided primarily for illustrative purposes.

In general, a computing device connected to a data network may have one or more vulnerabilities that can be leveraged to compromise the computing device. Vulnerabilities include unintentional program flaws such as a buffer with inadequate overrun prevention and intentional holes such as an undisclosed programmatic backdoor. Malicious code can, and has been, developed to exercise these various vulnerabilities to yield the execution of code under the control of an attacker. Malicious code implemented to target a particular vulnerability is sometimes referred to as an exploit. For example, malicious code may access an apparently benign interface and cause a buffer overflow resulting in the placement of unauthorized code in the execution stack where it may be run with elevated privileges. Such an attack could execute an exploit causing the buffer overflow and enabling an unauthorized party to obtain administrative control over the computing device. Commonly, the exploit code downloads additional components of the malware and modifies the operating system to become persistent. The computing device, now compromised, may be used for further attacks on other computing devices in the network or put to other malicious purposes.

Some compromised machines are configured to communicate with a remote endpoint, e.g., a command and control ("C&C") system. For example, a compromised machine may check in with a C&C to receive instructions for how the compromised machine should be used (e.g., to send unsolicited e-mails, i.e., "spam," or to participate in a distributed denial-of-service attack, "DDOS"). A compromised machine is sometimes referred to as a "Bot" or a "Zombie" machine. A network of these machines is often referred to as a "botnet."

Malicious code may be embodied in malicious software ("malware"). As used herein, malware includes, but is not limited to, computer viruses, worms, Trojans, rootkits, and spyware. Malware may generally include any software that circumvents user or administrative controls. Malicious code may be created by an individual for a particular use. Exploits may be created to leverage a particular vulnerability and then adopted for various uses, e.g., in scripts or network attacks. Generally, because new forms of malicious behavior are designed and implemented on a regular basis, it is desirable to recognize previously unknown malicious code.

In some instances, malware may be designed to avoid detection. For example, malware may be designed to load into memory before malware detection software starts during a boot-up phase. Malware may be designed to integrate into an operating system present on an infected machine. Malware may bury network communication in apparently benign network communication. Malware may connect to legitimate network endpoints to obscure connections to control servers or other targets. In some instances, malware behaves in an apparently benign manner until a trigger event, e.g., a set day, arrives. In some instances, malware is reactive to environmental conditions. For example, malware may be designed to behave in an apparently benign manner in the presence of malware detection software.

Suspicious computer code may be identified as malware by observing interactions between the suspicious computer code and remote network endpoints. Suspicious computer code may generate or receive data packets via a data network. For example, if a data packet has a source or destination endpoint matching a known command and control ("C&C") server, then the code may be malicious. Likewise, if the contents of a data packet are consistent with traffic models ("signatures") for the traffic produced by known malicious code, then the code may be malicious. A watch-list of known or suspected malicious servers (e.g., C&C servers) is maintained and a catalog of traffic models is maintained. When a set of communicated data packets is classified as malicious using the watch-list, the catalog is updated with a model of the data packets. When a set of communicated data packets is classified as malicious using the catalog of traffic models, the watch-list is updated with one or more endpoints data from the data packets.

Using the signatures to identify malicious network activities may provide precise detection. However, the signatures are generally built upon traffic models that have been created. Instead, an approach using anomalous behaviors (e.g., excessive traffic sent by a host to a remote target, identification of an abnormal login time for a particular user, etc.) has been proposed to detect malicious network activities. Such an anomaly detection approach may detect previously unrecognized or unmodeled malicious network activities. The anomaly detection approach, however, may be subject to a relatively high number of false positives, which may be because not all the anomalous behaviors are malicious. The present disclosure provides various embodiments of systems and methods to solve such a technical problem. In some embodiments, the disclosed system can first identify a network node that has been ascertained, by a threat detection system, as infected or compromised. The system can then generate an anomalous behavior model based on one more anomalous activities performed by the infected network node. Upon the generation of such an anomalous behavior model, the system can collect network data over a data network to identify respective anomalous activities performed by one or more of other network nodes in the data network to compare whether the anomalous activities sufficiently match the anomalous behavior model. Based on the comparisons, the system can precisely ascertain whether the one or more network nodes are actually infected.

FIG. 1 is a block diagram illustrating one embodiment of computing systems in a network environment 100. The network environment 100 can include a plurality of network nodes 102, 104, and 106 communicating with each other and/or one or more remote endpoints 150 via a data network 110. The network environment 100 can include or otherwise interface with a threat detection system 120 and a monitor system 130. The threat detection system 120 and the monitor system 130 can observe, monitor, and otherwise mange the communications of the network nodes 102-106. In some embodiments, the threat detection system 120 can store, maintain, or otherwise manage a watch-list of suspect endpoints and a catalog of traffic models characterizing malicious network activities; and the monitor system 130 can generate an anomalous behavior model based on anomalous activities of a network node that has been ascertained, by the threat detection system 120, as being compromised. Although the threat detection system 120 and the monitor system 130 are each represented as separate from each of the network nodes 102-106, the threat detection system 120 and the monitor system 130 can be integrated within each of the network nodes 102-106 itself while remaining within the scope of the present disclosure.

Figure 2:
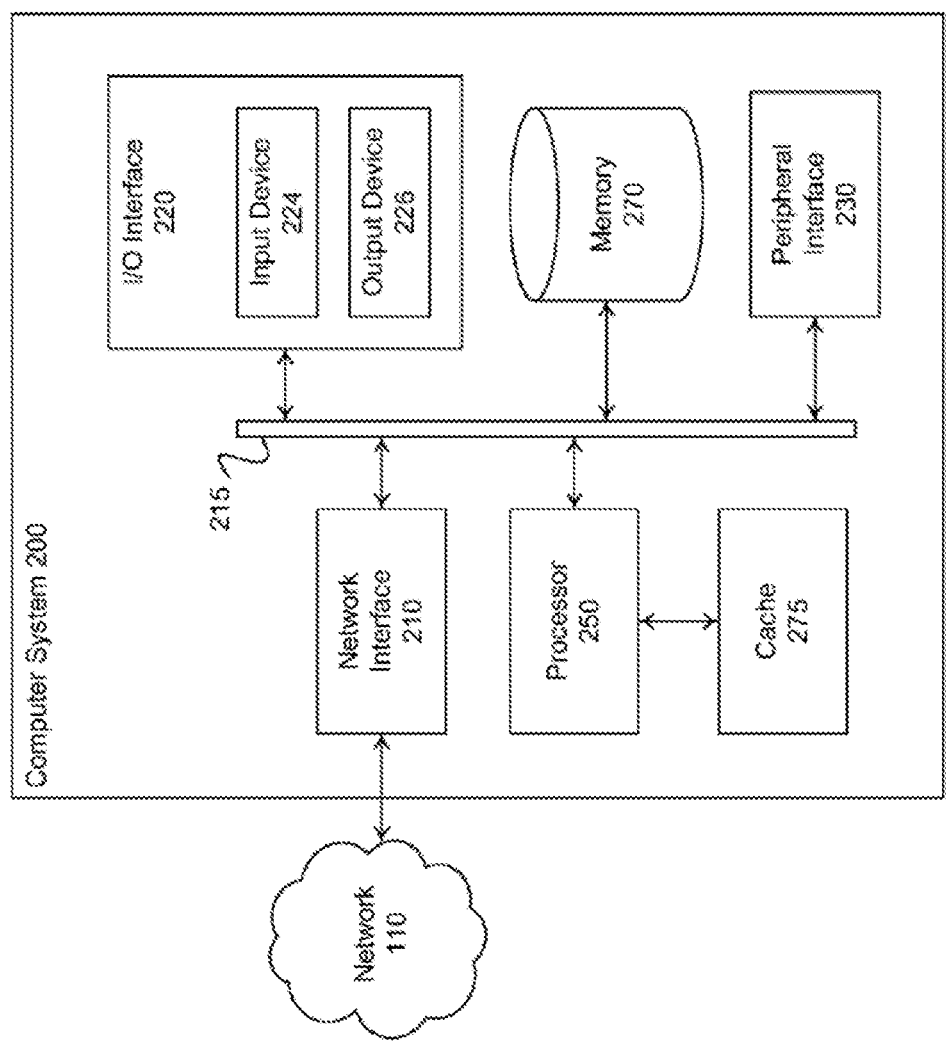
FIG. 2 is a block diagram illustrating one embodiment of a general architecture of a computing device useful in connection with the systems and methods described herein, according to an exemplary embodiment.

Each of the network nodes 102-106 may be any kind of computing device, including but not limited to, a laptop, desktop, tablet, electronic pad, personal digital assistant, smart phone, video game device, television, server, kiosk, or portable computer. In other embodiments, each of the network nodes 102-106 may be a virtual machine. Each of the network nodes 102-106 may be single-core, multi-core, or a cluster. Each of the network nodes 102-106 may operate under the control of an operating system, such as any of the operating systems from Apple, Inc. (e.g., OS X or iOS), from Microsoft, Inc. (e.g., Windows NT, MSCS, Windows XP, Windows Server 2008, Windows Server Failover Clustering, Windows 7, or Windows 8), from Google Inc. (e.g., Chrome or Android), or Bell Lab's UNIX and its derivatives (e.g., BSD, FreeBSD, NetBSD, Linux, Solaris, AIX, or HP/UX). Generally, each of the network nodes 102-106 may be any computing system susceptible to infection by malware, that is, any computing system. In some embodiments, each of the network nodes 102-106 is a computing device 200, as illustrated in FIG. 2 and described below.

Each of the network nodes 102-106 may communicate with each other and/or one or more remote endpoints 150 via the data network 110. The network 110 can be a local-area network (LAN), such as a company intranet, a metropolitan area network (MAN), or a wide-area network (WAN), such as the Internet and the World Wide Web. The network 110 may be any type and/or form of network and may include any of a point-to-point network, a broadcast network, a wide-area network, a local-area network, a telecommunications network, a data communication network, a computer network, an asynchronous transfer mode (ATM) network, a synchronous optical network (SONET), a wireless network, an optical fiber network, and a wired network. In some embodiments, there can be multiple networks 110 between participants, for example a smart phone typically communicates with Internet servers via a wireless network connected to a private corporate network connected to the Internet. The network 110 may be public, private, or a combination of public and private networks. The topology of the network 110 may be a bus, star, ring, or any other network topology capable of the operations described herein.

The remote endpoints 150 may be network-addressable endpoints. For example, a remote endpoint 150 may be a data server, a web site host, a domain name system (DNS) server, a router, or a personal computing device. A remote endpoint 150 may be represented by a network address, e.g., domain name or an IP address. An Internet Protocol ("IP") address may be an IPv4 address, an IPv6 address, or an address using any other network addressing scheme. In some embodiments, a remote endpoint 150 is an un-resolvable network address, that is, it may be an address that is not associated with a network device. Network communication to an un-resolvable address will fail until a network device adopts the address. For example, malware may attempt to communicate with a domain name that is not in use.

In some embodiments, the threat detection system 120 may be a distinct computing system monitoring the communications between the network nodes 102-106 and the remote endpoints 150. For example, the network nodes 102-106 and the threat detection system 120 may communicate with the network 110 via a shared router or switch. The threat detection system 120 may sniff packets on a local network, e.g., a network within a local computing environment that includes at least the network nodes 102-106 and the threat detection system 120. In some embodiments, the network nodes 102-106 may each be a virtual machine and the threat detection system 120 may be part of the virtual machine monitor ("VMM").

The threat detection system 120 may maintain a watch-list of suspect endpoints and a catalog of traffic models characterizing malicious network activity. Generally, a watch-list of suspect endpoints is a set of addresses corresponding to one or more of the remote endpoints 150 that are suspected of engaging in malicious network activity. For example, an address for a remote endpoint that is identified as a C&C server may be added to a watch-list (sometimes referred to as a "black list"). Network communication routed to or from an endpoint on a watch-list may be blocked to prevent operation of malware, such as a botnet. Generally, a traffic model characterizing malicious network activity may be any information set used to recognize network traffic. An example model for recognizing messages between a specific malware loader, a Pushdo loader, and its associated C&C server, shall be discussed with respect to FIG. 3. Generally, the threat detection system 120 may compare the contents or routing behavior of communications between the network nodes 102-106 and a remote endpoint with the traffic models in the catalog. The thread detection system 120 can ascertain one of the network nodes 102-106 as being compromised or infected based on determining that a destination of the data packets sent from the network node and/or a source of the data packets received by the network node is on the watch-list. Alternatively or additionally, the thread detection system 120 can ascertain one of the network nodes 102-106 as being compromised or infected based on determining that the data packets collected from the network node sufficiently match at least one of the traffic models in the catalog.

In some embodiments, the monitor system 130 may be a distinct computing system monitoring the communications between the network nodes 102-106 and the remote endpoints 150. For example, the network nodes 102-106 and the monitor system 120 may communicate with the network 110 via a shared router or switch. The monitor system 130 may sniff packets on a local network, e.g., a network within a local computing environment that includes at least the network nodes 102-106 and the monitor system 130. In some embodiments, the network nodes 102-106 may each be a virtual machine and the monitor system 130 may be part of the virtual machine monitor ("VMM").

The monitor system 130 can communicate or interface with the threat detection system 120 to identify, be informed, or otherwise receive one or more of the network nodes 102-106 as infected, e.g., the network node 102 (hereinafter "infected network node 102"). Upon identifying the infected network node 102, the monitor system 130 can determine a first timestamp corresponding to when the network node 102 is identified as being infected. The monitor system 130 can collect, log, intercept, or otherwise manage a first set of network data from the infected network node 102. The first set of network data can be a set of network traffic or data packets sent or received by the infected network node 102. The first set of network data can represent, identify, or otherwise include one or more anomalous activities performed by the infected network node 102. In some embodiments, the monitor system 130 can collect the one or more anomalous activities that each occurred at a timestamp substantially close to the first timestamp. For example, the monitor system 130 can collect the one or more anomalous activities that occurred concurrently with the first timestamp. In another example, the monitor system 130 can collect the one or more anomalous activities that occurred within a predetermined time range prior to or subsequently to the first timestamp.

Upon collecting the first set of network data including the one or more anomalous activities performed by the infected network node 102, the monitor system 130 can generate an anomalous behavior model using the first set of network data. In some embodiments, the anomalous behavior model can include a number of characteristics representing the one or more anomalous activities performed by the infected network node 102.

The monitor system 130 can generate the anomalous behavior model to include one or more temporal characteristics of the one or more anomalous activities. The temporal characteristic can be a recurring interval of the one or more anomalous activities. Alternatively or additionally, the temporal characteristic can be an occurrence time of each of the one or more anomalous activities. For example, the one or more anomalous activities, which can be uploading a document to a remote endpoint, may be performed by the infected network node 102 during 2 AM-3 AM every Monday. Accordingly, the monitor system 130 can generate the anomalous behavior model including an occurrence time to be any time between 2 AM and 3 AM and/or a recurring interval to be 1 week.

The monitor system 130 can generate the anomalous behavior model to include one or more volumetric characteristics of the one or more anomalous activities. The volumetric characteristics can include a data size of the first set of network data that includes the one or more anomalous activities. For example, the one or more anomalous activities, which can be downloading an application in an abnormally large size (e.g., 1 gigabyte), may be performed by the infected network node 102. Accordingly, the monitor system 130 can generate the anomalous behavior model including a data size to be about 1 gigabyte.

The monitor system 130 can generate the anomalous behavior model to include one or more content-based characteristics of the one or more anomalous activities. The content-based characteristics can include a data type of the first set of network data that includes the one or more anomalous activities. For example, the one or more anomalous activities, which can be downloading and uploading an application in an abnormal data type, may be performed by the infected network node 102. Accordingly, the monitor system 130 can generate the anomalous behavior model including a data type to be such a particular data type.

The monitor system 130 can generate the anomalous behavior model to include one or more location-based characteristics of the one or more anomalous activities. The location-based characteristics can include a destination point to which the first set of network data that includes the one or more anomalous activities is transmitted. For example, the one or more anomalous activities, which can be uploading an application to an endpoint or network node that is located at an abnormal location, may be performed by the infected network node 102. Accordingly, the monitor system 130 can generate the anomalous behavior model including a destination to be such an abnormal location.

In some embodiments, the monitor system 130 can generate the anomalous behavior model to include any combination of the above-described characteristics (hereinafter "first characteristics"). It should be appreciated that the monitor system 130 can include, in the first characteristics, the characteristics of any of a variety of anomalous activities to generate the anomalous model. Examples of other anomalous activities can include at least one of: communication with an unrecognized or abnormal host, use of an unrecognized or abnormal protocol, use of an unrecognized or abnormal service, use of unrecognized or abnormal encrypted communications, an abnormal amount of domain name system (DNS) or hypertext transfer protocol (HTTP) errors, and abnormal user-agent strings in HTTP traffic beaconing behaviors.

Concurrently with or subsequently to generating the anomalous behavior model using the first set of network data, the monitor system 130 can collect, log, intercept, or otherwise manage a second set of network data from one of the network nodes other than the infected network node 102 (hereinafter "monitored network node"). The second set of network data can be a set of network traffic or data packets sent or received by the monitored network node (e.g., 104). The second set of network data can represent, identify, or otherwise include one or more anomalous activities performed by the monitored network node.

Upon collecting the second set of network data, the monitor system 130 can compare the characteristics of the anomalous activities performed by the monitored network node (hereinafter "second characteristics") with the generated anomalous behavior model. In some embodiments, the second characteristics can include at least one of: a recurring interval of the one or more anomalous activities performed by the monitored network node, an occurrence time of each of the one or more anomalous activities performed by the monitored network node, a data size of the second set of network data that includes the one or more anomalous activities performed by the monitored network node, a data type of the second set of network data that includes the one or more anomalous activities performed by the monitored network node, and a destination point to which the second set of network data that includes the one or more anomalous activities performed by the monitored network node is transmitted.

Based on the comparison, the monitor system 130 can determine whether the second characteristics sufficiently match the first characteristics (included in the anomalous behavior model). For example, the monitor system 130 can determine whether the similarity between the second characteristics and the first characteristics exceeds a predefined threshold. If the similarity exceeds the threshold, the monitor system 130 can ascertain that the monitored network node is also an infected network node. On the other hand, if the similarity does not exceed the threshold, the monitor system 130 can continue collecting network data from the monitored network node for comparison or ascertain that the monitored network node is not an infected network node.

In some embodiments, the monitor system 130 can quantify the similarity by counting the number of matches between the second characteristics and the first characteristics. In the above example where the first characteristics include a temporal characteristic of the anomalous activities performed by the infected network node 102, the monitor system 130 can compare whether a recurring interval and occurrence times of the anomalous activities performed by the monitored network node 104 respectively match the recurring interval and occurrence times of the anomalous activities performed by the infected network node 102. If so, the monitor system 130 may increment the similarity by 1; and if not, the monitor system 130 may maintain the similarity. In some embodiments, the threshold to be compared with the similarity may be a static value, or a dynamically varying value. For example, the monitor system 130 can dynamically adjust, update, or vary the threshold based on at least one of the number of network nodes communicated via the network 110, the current timestamp, and the size of network traffic communicated via the network 110. In some embodiments, the monitor system 130 can quantify the similarity by counting the number of matches between the second characteristics and the first characteristics in terms of "classification." Each of the first and second characteristics can include a number of classifications such as, for example, a temporal characteristic, a volumetric characteristic, a content-based characteristic, a location-based characteristic, among others. The monitor system 130 can increment the similarity by 1 in response to determining that the temporal characteristic of the first characteristics sufficiently matches the temporal characteristic of the second characteristics (e.g., satisfying the threshold), increment the similarity by another 1 in response to determining that the location-based characteristic of the first characteristics sufficiently matches the location-based characteristic of the second characteristics (e.g., satisfying the threshold), and so on.

In some embodiments, one or more of the systems illustrated in FIG. 1 are constructed to be similar to the computing system 200 of FIG. 2. In some embodiments, a server may be made up of multiple computing systems 200. In some embodiments, a server may be a virtual server, for example, a cloud-based server accessible via the network 110. A cloud-based server may be hosted by a third-party cloud service host. A server may be made up of multiple computing systems 200 sharing a location or distributed across multiple locations. The multiple computing systems 200 forming a server may communicate using the network 110. The multiple computing systems 200 forming a server may communicate using a private network, e.g., a network distinct from a publicly-accessible network or a virtual private network within a publicly-accessible network.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some embodiments, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennae, signal receivers, measurement devices, and data conversion devices. In some uses, peripherals include a network interface and connect with the computing system 200 via the network 110 and the network interface 210. For example, a printing device may be a network accessible printer.

The computing system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing system 200 may comprise a gaming device such as a PlayStation (PS 1/2/3/4/x) or Personal PlayStation Portable (PSP) device manufactured by the Sony Corporation of Tokyo, Japan, a Nintendo, Game Boy, or Wii device manufactured by Nintendo Co., Ltd., of Kyoto, Japan, or an XBox or XBox 360 device manufactured by the Microsoft Corporation of Redmond, Wash. For example, the computing system 200 may comprise a tablet device such as one of the iPad family of devices manufactured by Apple Computer of Cupertino, Calif.

FIG. 3 illustrates an example model for recognizing messages. The traffic model 350 recognizes a communication as part of a malicious network activity. The traffic model 350 may include, for example, control information 362, an alert message 364, patterns for protocol information and routing information 368, content patterns 372, hash values 375, classification information 382, and versioning information 384. In the example traffic model 350 illustrated in FIG. 3, a regular expression 372 matches content for a Pushdo loader and a message digest 375 that characterizes the binary program that generated the traffic. The Pushdo loader is malware that is used to install (or load) modules for use of an infected machine as a bot. For example, Pushdo has been used to load Cutwail and create large numbers of spam bots. The traffic model 350 for recognizing Pushdo is provided as an example signature.

Generally, the threat detection system 120 may compare the contents or routing behavior of communications between the network nodes 102-106 and the remote endpoints 150 with a traffic model 350, e.g., as found in a catalog of traffic models characterizing malicious network activity. A traffic model 350 may be generated for traffic known to be malicious network activity by identifying characteristics of the network traffic. The traffic model 350 is a type of "signature" for the identified malicious network activity.

A regular expression 372 may be used to identify suspect network communication. A regular expression may be expressed in any format. One commonly used set of terminology for regular expressions is the terminology used by the programming language Perl, generally known as Perl regular expressions, "Perl RE," or "Perl RegEx." (POSIX BRE is also common). Network communications may be identified as matching a traffic model 350 if a communication satisfies the regular expression 372 in the traffic model 350. A regular expression to match a set of strings may be generated automatically by identifying common patterns across the set of strings and generating a regular expression satisfied by a common pattern. In some embodiments, other characteristics are used as a model. For example, in some embodiments, packet length, number of packets, or repetition of packets is used as a model. In some embodiments, content repetition within a packet is used as a model. In some embodiments, timing of packets is used as a model.

A message digest 375 may be used to characterize a block of data, e.g., a binary program. One commonly used message digest algorithm is the "md5 hash" algorithm created by Dr. Rivest. In some embodiments, network communications may be identified if a message digest for a program generating or receiving the communication is equivalent to the message digest 375 in the traffic model 350.

Control information 362 may be used to control or configure use of the traffic model. The example traffic model illustrated in FIG. 3 is applied to TCP flows using port $HTTP_PORTS, e.g., 80, 443, or 8080.

An alert message 364 may be used to signal an administrator that the traffic model has identified suspect network traffic. The alert message 364 may be recorded in a log. The alert message 364 may be transmitted, e.g., via a text message or e-mail. The alert message 364 may be displayed on a screen. In some embodiments, a generic alert message is used. In some embodiments, an alert message is generated based on available context information.

Patterns for protocol information and routing information 368 may indicate various protocols or protocol indicators for the traffic model. For example, as illustrated in FIG. 3, the Pushdo traffic uses the HTTP protocol.

Classification information 382 may be used to indicate the type of suspect network activity. For example, as illustrated in FIG. 3, Pushdo is a Trojan. Other classifications may include: virus, worm, or drive-by.

Versioning information 384 may be used to assign an identifier (e.g., signature ID) and or a version number for the traffic model.

Figure 4:
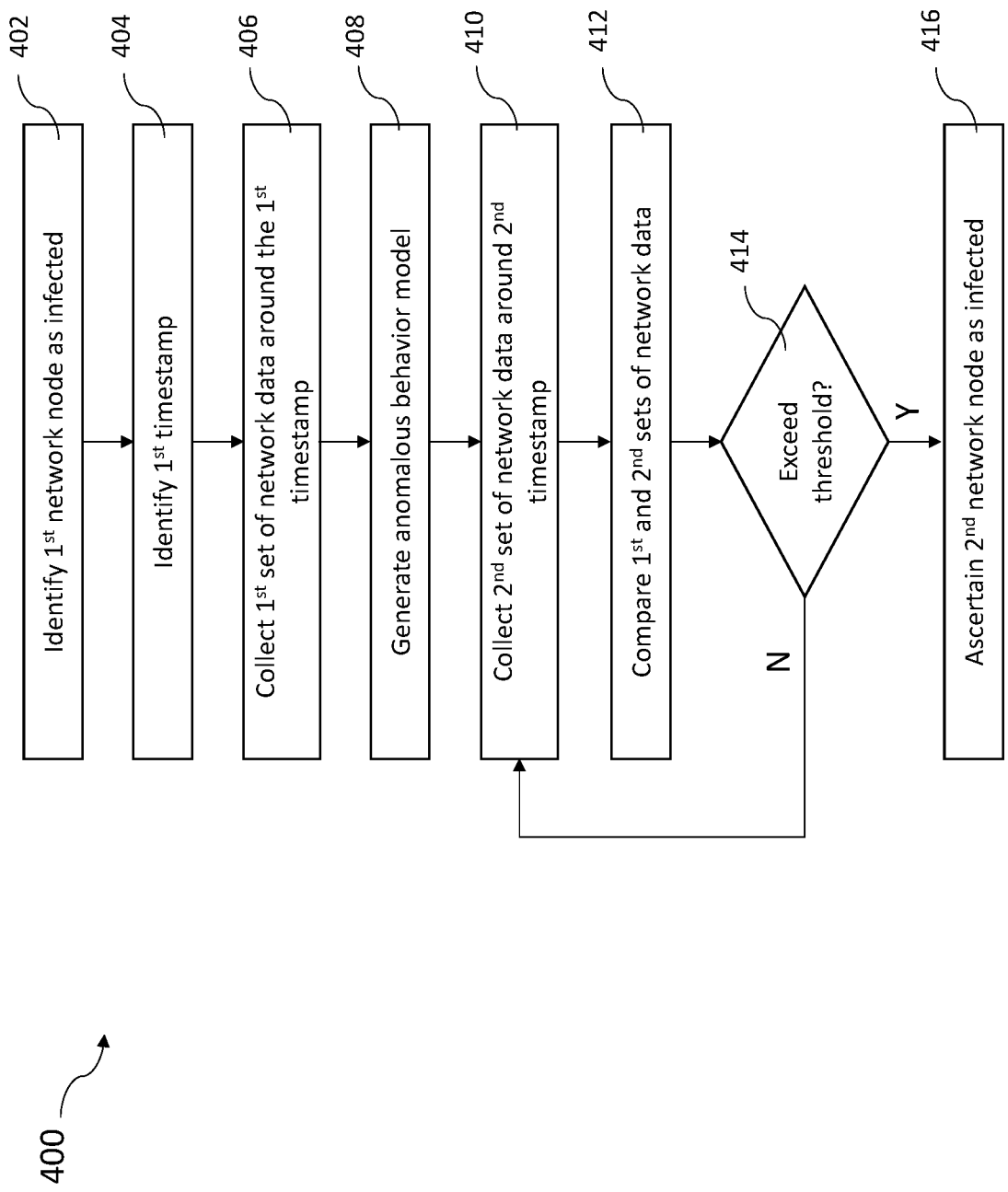
FIG. 4 is a flow diagram of a method for identifying an infected network node based on an anomalous behavior model, according to an exemplary embodiment.

Referring now to FIG. 4, FIG. 4 illustrates a method 400 for identifying infected network nodes based on an anomalous behavior model, in accordance with one or more embodiments. Operations of the method 400 presented below are intended to be illustrative. In some embodiments, the method 400 may be accomplished with one or more additional operations not described, and/or without one or more of the operations discussed. Additionally, the order in which the operations of the method 400 as illustrated in FIG. 4 and described below is not intended to be limiting.

In some embodiments, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

In brief overview, the method 400 may include identifying a first network node as infected (BLOCK 402). The method 400 may include identifying a first timestamp (BLOCK 404). The method 400 may include collecting a first set of network data around the first timestamp (BLOCK 406). The method 400 may include generating an anomalous behavior model (BLOCK 408). The method 400 may include collecting a second set of network data around a second timestamp (BLOCK 410). The method 400 may include comparing the first and second sets of network data (BLOCK 412). The method 400 may include a determination regarding whether a similarity between the first and second sets of network data exceeds a threshold (BLOCK 414). If so, the method 400 may proceed with ascertaining a second network node as infected (BLOCK 416); and if not, the method may proceed with collecting another set of network data from the second network node (BLOCK 410).

In further detail, the method 400 may include identifying a first network node as infected (BLOCK 402). In some embodiments, a monitor system (e.g., 130) can communicate with a threat detection system (e.g., 120) to identify a first network node (e.g., 102) that has been ascertained as being infected or compromised. The thread detection system 120 can ascertain the network node 102 as being infected based on determining that a destination of the data packets sent from the network node and/or a source of the data packets received by the network node is on the watch-list. Alternatively or additionally, the thread detection system 120 can ascertain the network node 102 as being infected based on determining that the data packets collected from the network node sufficiently match at least one of the traffic models in the catalog.

The method 400 may include identifying a first timestamp (BLOCK 404). Continuing with the above example, upon identifying the infected network node 102 by communicating with the thread detection system 120, the monitor system 130 can determine a first timestamp. In some embodiments, the first timestamp can correspond to when the network node 102 was identified as being infected.

The method 400 may include collecting a first set of network data around the first timestamp (BLOCK 406). According to some embodiments, the monitor system 130 can collect, log, intercept, or otherwise manage a first set of network data from the infected network node 102. The first set of network data can be a set of network traffic or data packets sent or received by the infected network node 102. The first set of network data can represent, identify, or otherwise include one or more anomalous activities performed by the infected network node 102. In some embodiments, the monitor system 130 can collect the one or more anomalous activities that each occurred at a timestamp substantially close to the first timestamp. For example, the monitor system 130 can collect the one or more anomalous activities that occurred concurrently with the first timestamp. In another example, the monitor system 130 can collect the one or more anomalous activities that occurred within a predetermined time range prior to or subsequently to the first timestamp.

The method 400 may include generating an anomalous behavior model (BLOCK 408). In some embodiments, in response to collecting the first set of network data including the one or more anomalous activities performed by the infected network node 102, the monitor system 130 can generate an anomalous behavior model using the first set of network data. The anomalous behavior model can include a number of characteristics representing the one or more anomalous activities performed by the infected network node 102 ("first characteristics"). For example, the anomalous behavior model can include at least one of the above-discussed characteristics of the anomalous activities performed by the infected network node 102: temporal characteristics, volumetric characteristics, content-based characteristics, and location-based characteristics.

The method 400 may include collecting a second set of network data around a second timestamp (BLOCK 410). In some embodiments, the monitor system 130 can collect, log, intercept, or otherwise manage a second set of network data from one of the network nodes other than the infected network node 102 (hereinafter "monitored network node"). The second set of network data can be a set of network traffic or data packets sent or received by the monitored network node (e.g., 104). The second set of network data can represent, identify, or otherwise include one or more anomalous activities performed by the monitored network node. In some embodiments, the monitor system 130 can collect the one or more anomalous activities that occurred around a second timestamp. The second timestamp may or may not be substantially close to the first timestamp. For example, the second timestamp can be prior or subsequent to the first timestamp by a certain time range.

The method 400 may include comparing the first and second sets of network data (BLOCK 412). Upon collecting the second set of network data, the monitor system 130 can compare the characteristics of the anomalous activities performed by the monitored network node (hereinafter "second characteristics") with the generated anomalous behavior model.

Based on the comparison, the monitor system 130 can determine whether the second characteristics sufficiently match the first characteristics included in the anomalous behavior model (BLOCK 414). For example, the monitor system 130 can determine whether the similarity between the second characteristics and the first characteristics exceeds a predefined threshold. If the similarity exceeds the threshold ("Y" route from BLOCK 414), the monitor system 130 can ascertain that the monitored network node is also an infected network node. On the other hand, if the similarity does not exceed the threshold ("N" route from BLOCK 414), the monitor system 130 can continue collecting network data from the monitored network node for comparison or ascertain that the monitored network node is not an infected network node.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for identifying infected nodes within a network, comprising:
   identifying a first network node of a plurality of network nodes as infected;
   collecting a first set of network data from the first network node including one or more anomalous activities performed by the first network node;
   generating an anomalous behavior model using the first set of network data, wherein the anomalous behavior model comprises a number of characteristics representing the one or more anomalous activities performed by the first network node;
   collecting a second set of network data from a second network node of the plurality of network nodes including one or more anomalous activities performed by the second network node;
   comparing characteristics of the one or more anomalous activities from the second set of network data to the generated anomalous behavior model;
   determining, from the comparison, that a similarity between a first characteristic associated with the one or more anomalous activities performed by the first network node and a second characteristic associated with the one or more anomalous activities performed by the second network node exceeds a predefined threshold; and
   ascertaining, based on the determination, the second network node as an infected network node.

2. The method of claim 1, further comprising:
   determining a first timestamp corresponding to when the first network node is identified as infected; and
   collecting the first set of network data to include the one or more anomalous activities that each occurred at a timestamp substantially close to the first timestamp.

3. The method of claim 1, wherein the first characteristic includes at least one of a recurring interval of the one or more anomalous activities performed by the first network node or an occurrence time of each of the one or more anomalous activities performed by the first network node, and the second characteristic includes at least one of a recurring interval of the one or more anomalous activities performed by the first network node and an occurrence time of each of the one or more anomalous activities performed by the second network node.

4. The method of claim 1, wherein the first characteristic includes a data size of the first set of network data, and the second characteristic includes a data size of the second set of network data.

5. The method of claim 1, wherein the first characteristic includes a data type of the first set of network data, and the second characteristic includes a data type of the second set of network data.

6. The method of claim 1, wherein the first characteristic includes a destination point to which the first set of network data is transmitted, and the second characteristic includes a destination point to which the second set of network data is transmitted.

7. The method of claim 1, further comprising:
   communicating with a threat detection system to ascertain that the first network node is infected prior to collecting the first set of network data.

8. A computing device comprising:
   a memory; and
   one or more processors operatively coupled to the memory, the one or more processors being to:
   identify a first network node of a plurality of network nodes as infected;
   collect a first set of network data from the first network node including one or more anomalous activities performed by the first network node;
   generate an anomalous behavior model using the first set of network data, wherein the anomalous behavior model comprises a number of characteristics representing the one or more anomalous activities performed by the first network node;
   collect a second set of network data from a second network node of the plurality of network nodes including one or more anomalous activities performed by the second network node;
   compare characteristics of the one or more anomalous activities from the second set of network data to the generated anomalous behavior model;
   determine, from the comparison, that a similarity between a first characteristic associated with the one or more anomalous activities performed by the second network node and a second characteristic associated with the one or more anomalous activities performed by the first network node exceeds a predefined threshold; and
   ascertain, based on the determination, the second network node as an infected network node.

9. The computing device of claim 8, wherein the one or more processors are further to:
   determine a first timestamp corresponding to when the first network node is identified as infected; and
   collect the first set of network data to include the one or more anomalous activities that each occurred at a timestamp substantially close to the first timestamp.

10. The computing device of claim 8, wherein the first characteristic includes at least one of a recurring interval of the one or more anomalous activities performed by the first network node or an occurrence time of each of the one or more anomalous activities performed by the first network node, and the second characteristic includes at least one of a recurring interval of the one or more anomalous activities performed by the first network node and an occurrence time of each of the one or more anomalous activities performed by the second network node.

11. The computing device of claim 8, wherein the first characteristic includes a data size of the first set of network data, and the second characteristic includes a data size of the second set of network data.

12. The computing device of claim 8, wherein the first characteristic includes a data type of the first set of network data, and the second characteristic includes a data type of the second set of network data.

13. The computing device of claim 8, wherein the first characteristic includes a destination point to which the first set of network data is transmitted, and the second characteristic includes a destination point to which the second set of network data is transmitted.

14. The computing device of claim 8, wherein the one or more processors are further to communicate with a threat detection system to ascertain that the first network node is infected prior to collecting the first set of network data.

15. A non-transitory computer readable medium storing program instructions for causing one or more processors to:
   identify a first network node of a plurality of network nodes as infected;
   collect a first set of network data from the first network node including one or more anomalous activities performed by the first network node;

generate an anomalous behavior model using the first set of network data, wherein the anomalous behavior model comprises a number of characteristics representing the one or more anomalous activities performed by the first network node;

collect a second set of network data from a second network node of the plurality of network nodes including one or more anomalous activities performed by the second network node;

compare characteristics of the one or more anomalous activities from the second set of network data to the generated anomalous behavior model;

determine, from the comparison, that a similarity between a first characteristic associated with the one or more anomalous activities performed by the second network node and a second characteristic associated with the one or more anomalous activities performed by the first network node exceeds a predefined threshold; and ascertain, based on the determination, the second network node as an infected network node.

16. The non-transitory computer readable medium of claim 15, wherein the program instructions further cause the one or more processors to:

determine a first timestamp corresponding to when the first network node is identified as infected; and collect the first set of network data to include the one or more anomalous activities that each occurred at a timestamp substantially close to the first timestamp.

17. The non-transitory computer readable medium of claim 15, wherein the first characteristic includes at least one of a recurring interval of the one or more anomalous activities performed by the first network node or an occurrence time of each of the one or more anomalous activities performed by the first network node, and the second characteristic includes at least one of a recurring interval of the one or more anomalous activities performed by the first network node and an occurrence time of each of the one or more anomalous activities performed by the second network node.

18. The non-transitory computer readable medium of claim 15, wherein the first characteristic includes a data size of the first set of network data, and the second characteristic includes a data size of the second set of network data.

19. The non-transitory computer readable medium of claim 15, wherein the first characteristic includes a data type of the first set of network data, and the second characteristic includes a data type of the second set of network data.

20. The non-transitory computer readable medium of claim 15, wherein the first characteristic includes a destination point to which the first set of network data is transmitted, and the second characteristic includes a destination point to which the second set of network data is transmitted.

* * * * *